US008548843B2

(12) United States Patent
Folk et al.

(10) Patent No.: US 8,548,843 B2
(45) Date of Patent: Oct. 1, 2013

(54) INDIVIDUAL PERFORMANCE METRICS SCORING AND RANKING

(75) Inventors: Amy B. Folk, Charlotte, NC (US); Mark D. Bowser, Happy Valley, OR (US); Grant F. Tyler, Folsom, CA (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 13/282,572

(22) Filed: Oct. 27, 2011

(65) Prior Publication Data

US 2013/0110590 A1   May 2, 2013

(51) Int. Cl.
*G06Q 10/00* (2012.01)
(52) U.S. Cl.
USPC ........ 705/7.42; 705/7.38; 705/7.39; 705/7.41
(58) Field of Classification Search
USPC ............................... 705/7.38, 7.39, 7.41, 7.42
See application file for complete search history.

(56) References Cited

U.S. PATENT DOCUMENTS

| | | | | |
|---|---|---|---|---|
| 6,035,295 | A * | 3/2000 | Klein | 1/1 |
| 2003/0187725 | A1 * | 10/2003 | Jotkowitz | 705/1 |
| 2004/0088177 | A1 * | 5/2004 | Travis et al. | 705/1 |
| 2004/0138944 | A1 * | 7/2004 | Whitacre et al. | 705/11 |
| 2004/0210475 | A1 * | 10/2004 | Starnes et al. | 705/11 |
| 2006/0010001 | A1 * | 1/2006 | Hamelink | 705/1 |
| 2006/0282306 | A1 * | 12/2006 | Thissen-Roe | 705/11 |
| 2007/0271260 | A1 * | 11/2007 | Valentino | 707/5 |
| 2008/0120120 | A1 * | 5/2008 | Cirulli et al. | 705/1 |
| 2008/0228549 | A1 * | 9/2008 | Harrison | 705/9 |
| 2010/0121686 | A1 * | 5/2010 | Mahadevan et al. | 705/11 |
| 2012/0047053 | A1 * | 2/2012 | Favreau et al. | 705/35 |
| 2012/0130771 | A1 * | 5/2012 | Kannan et al. | 705/7.32 |

OTHER PUBLICATIONS

Piatt, Le Ann Estes. "Analysis of Municipal Government Performan Systems", 1998, Texas State University Master's theses, pp. i-97.*
Zawacki, Robert A, Couger, J. Daniel. "Evaluating Performance Appraisal Systems for IS Personnel", ACM, 1988, pp. 144-147.*
Bowen, David E., Lawler, Edward E III. "Total Quality-Oriented Human Resource Management", 1998, Center for Effective Organizations, pp. 1-19.*
Electronic Displays, Inc. "Catalog Request", May 2004, 13 Pages, http://www.electronicdisplays.com.*
Mattec Corporation, "The-MAN-A-ger(c) Overview" http://www.mattec.com/manager/index.htm, May 17, 2004, 3 Pgs.*

* cited by examiner

*Primary Examiner* — Jonathan G Sterrett
*Assistant Examiner* — Stephanie Delich
(74) *Attorney, Agent, or Firm* — Weiss & Arons LLP; Michael Springs

(57) ABSTRACT

A method for ranking the performance data of a plurality of employees. The method may include using a receiver to receive information relating to the performance, by each of the employees, of a plurality of tasks. Each of the plurality of tasks may be tasks completed during a predetermined time period. The method may also include using a processor to compute for each of the plurality of employees, based at least in part on the received data, a median cycle time score, an accuracy score, an escalation percentage score, a volume score and a client target date score. The method may further include using the processor to rank, using percentile ranking, the of the median cycle time scores, accuracy scores, escalation percentage scores, volume scores and client target date scores.

14 Claims, 4 Drawing Sheets

| LOB FOR STACK RANKING | TENURE (MTHS) | HIGH COMPLEXITY | % MET MEDIAN CT SCORE | ACCURACY SCORE | ESCALATION SCORE | VOL | CTD | WEIGHTED SCORE AVG | MEDIAN CT RANK | ACCURACY RANK | ESCALATION RANK | VOL | CTD | WEIGHTED RANK AVG | OVERALL % RANK |
|---|---|---|---|---|---|---|---|---|---|---|---|---|---|---|---|
| | | | 30% | 20% | 10% | 10% | 30% | | | | | | | | |
| LARGE CORPORATE | >12 | Y | 82.1% | 98.5% | 100.0% | 150.0% | 93.0% | 97.2% | 96.7% | 96.7% | 16.1% | 100.0% | 96.7% | 89.0% | 100% |
| LARGE CORPORATE | >12 | Y | 67.7% | 95.4% | 100.0% | 99.0% | 87.0% | 85.4% | 83.8% | 74.1% | 16.1% | 50% | 93.5% | 74.6% | 96.7% |

FIG. 4

| DATE RANGE: MAR 2011 - MAY 2011 | | | | 57.8% | 88.7% | 100.0% | 124.0% | 100.0% | 30.0% | 20.0% | 10.0% | 10.0% | 30.0% | | |
|---|---|---|---|---|---|---|---|---|---|---|---|---|---|---|---|
| | | | | % MET MEDIAN CT SCORE | ACCURACY SCORE | ESCALATION SCORE | VOLUME SCORE | % MET CTD SCORE | % MEDIAN CT RANK | ACCURACY RANK | ESCALATION RANK | VOLUME RANK | % MET CTD RANK | WEIGHTED RANK AVG | OVERALL % RANK |
| IA NAME | SITE MGR | RANK LOB | TENURE (MTHS) | 75TH PERCENTILE SCORE | | | | COMMERCIAL > 12 MONTH | | | WEIGHTINGS | | | | |
| A | MANAGER L | COMMERCIAL | >12 | 73.0% | 94.1% | 100.0% | 171.3% | 99.7% | 97.2% | 96.7% | 52.0% | 98.6% | 69.8% | 84.6% | 100% |
| B | MANAGER M | COMMERCIAL | >12 | 73.8% | 92.7% | 99.3% | 171.2% | 100.0% | 98.6% | 89.0% | 28.7% | 97.2% | 71.2% | 81.3% | 98.6% |
| C | MANAGER N | COMMERCIAL | >12 | 63.3% | 93.8% | 100.0% | 100.5% | 100.0% | 87.6% | 95.8% | 52.0% | 49.3% | 71.2% | 76.9% | 97.2% |
| D | MANAGER O | COMMERCIAL | >12 | 71.9% | 93.2% | 100.0% | 84.7% | 100.0% | 95.8% | 91.7% | 52.0% | 28.7% | 71.2% | 76.5% | 95.8% |
| E | MANAGER P | COMMERCIAL | >12 | 67.1% | 93.6% | 100.0% | 86.2% | 99.6% | 93.1% | 93.1% | 52.0% | 32.8% | 68.4% | 75.6% | 94.5% |
| F | MANAGER Q | COMMERCIAL | >12 | 62.5% | 87.6% | 100.0% | 137.1% | 100.0% | 84.9% | 69.8% | 52.0% | 90.4% | 71.2% | 75.0% | 93.1% |
| G | MANAGER R | COMMERCIAL | >12 | 71.8% | 90.3% | 99.4% | 98.8% | 99.6% | 94.5% | 80.8% | 35.6% | 46.5% | 67.1% | 74.5% | 91.7% |
| H | MANAGER S | COMMERCIAL | >12 | 64.1% | 89.2% | 100.0% | 114.5% | 100.0% | 90.4% | 78.0% | 52.0% | 63.0% | 71.2% | 73.9% | 90.4% |
| I | MANAGER T | COMMERCIAL | >12 | 59.1% | 85.5% | 100.0% | 178.5% | 100.0% | 79.4% | 49.3% | 52.0% | 100.0% | 71.2% | 70.2% | 89.0% |
| J | MANAGER U | COMMERCIAL | >12 | 63.8% | 87.2% | 99.9% | 139.7% | 98.9% | 89.0% | 67.1% | 52.0% | 93.1% | 43.8% | 67.8% | 87.6% |
| K | MANAGER V | COMMERCIAL | >12 | 57.6% | 92.4% | 100.0% | 70.7% | 100.0% | 73.9% | 87.6% | 52.0% | 12.3% | 71.2% | 67.5% | 86.3% |

FIG. 5

INDIVIDUAL PERFORMANCE METRICS SCORING AND RANKING

FIELD OF TECHNOLOGY

This invention relates to scoring and ranking performance data. More specifically, this invention relates to scoring and ranking performance data of a plurality of employees.

BACKGROUND OF THE DISCLOSURE

Many businesses and corporations score the performance of their employees. Such businesses and corporations may also desire to divide their employees into two or more peer groups and rank each employee's performance against other employees in his or her peer group.

It would be desirable, therefore, to provide an automated system that computes and ranks employee performance for multiple peer groups.

Additionally, businesses and corporations compare the performance of a single employee who completes a certain subset of tasks to the performance of employees who complete different subsets of tasks that are similar to the employee's tasks.

It would be further desirable, therefore, to provide an automated system configured to normalize and compare the performance of a single employee who completes a first subset of tasks to the performance of employees who complete, at least in part, different subsets of tasks.

SUMMARY OF THE DISCLOSURE

Apparatus for ranking employees is provided. The apparatus may include a receiver configured to receive information relating to the performance, by an employee, of a plurality of tasks. Each of the plurality of tasks may be completed during a predetermined time period. The apparatus may also include a processor configured to compute, based at least in part on the received data, a median or average cycle time score, the median or average cycle time score being based on a number of times that the employee met a median or average cycle time assigned to one or more of the plurality of tasks. The processor may also be configured to compute an accuracy score, the accuracy score being based on a number of times that an error was recorded for one or more of the plurality of tasks. The processor may additionally be configured to compute an escalation percentage score, the escalation percentage score being based on a number of times that a complaint was recorded for one or more of the plurality of tasks. The processor may further be configured to compute a volume score, the volume score being based on a numerical value associated with the plurality of tasks. The processor may also be configured to compute a client target date score, the client target date score being based on a number of tasks included in the plurality of tasks that met a client target date. Furthermore, the apparatus may be configured to compute other performance-related metrics.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which:

FIG. 4 shows an electronic display in accordance with the systems and methods of the invention; and FIG. 5 shows another electronic display in accordance with the systems and methods of the invention.

DETAILED DESCRIPTION OF THE DISCLOSURE

Figure 1:
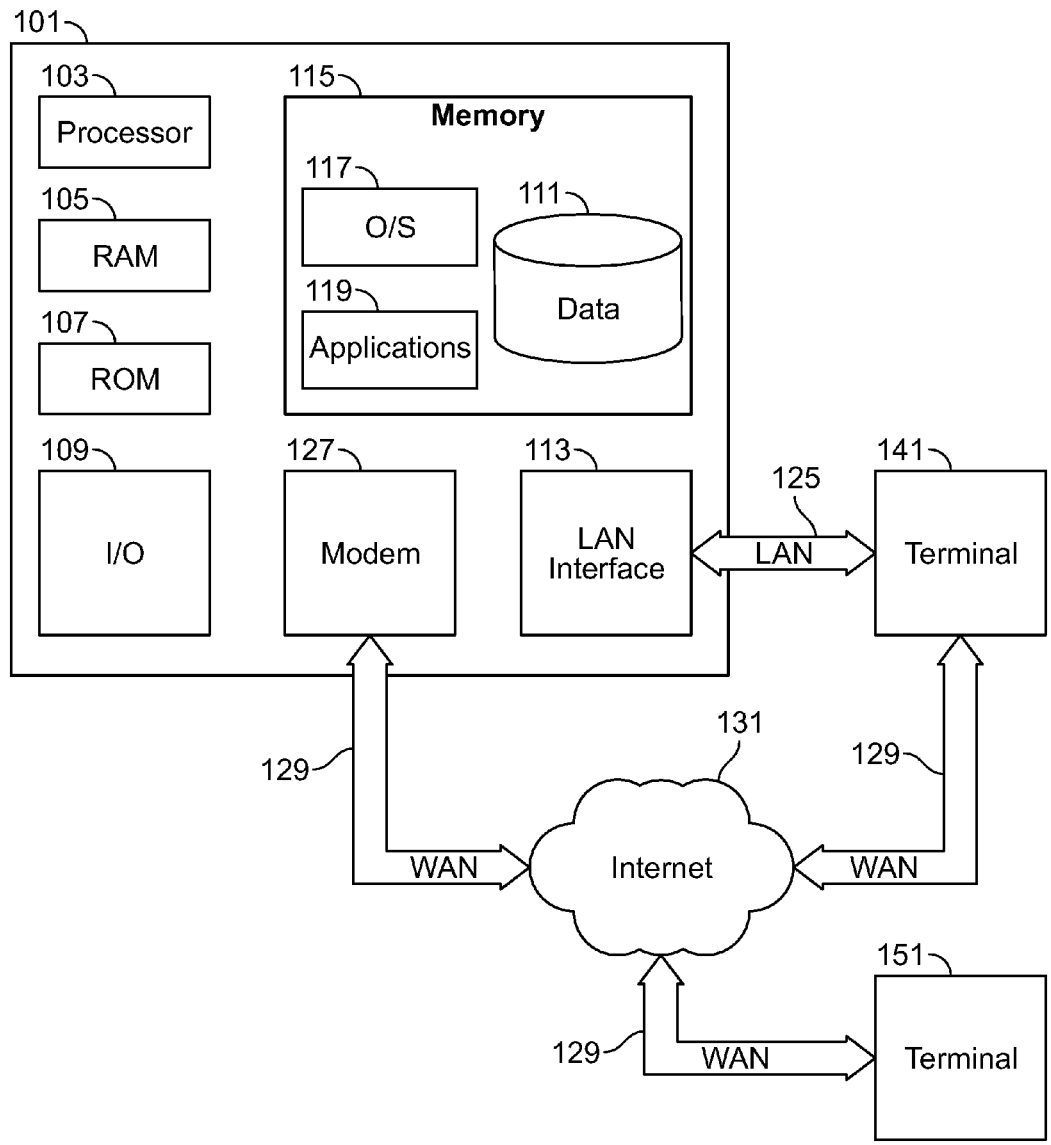
FIG. 1 shows apparatus that may be used in accordance with the systems and methods of the invention.

The systems and methods of the invention relate to the computation and ranking of employee performance. The invention may include an employee ranking application. The employee ranking application may compute values relating to employee performance during a predetermined time period. The predetermined time period may be a number of months, a time span between two calendar dates, a period of employment of an employee or any other suitable time span.

The computation of employee performance may include raw scores relating to one or more factors. The factors may include, for example, one or more of a median cycle time (referred to alternately hereinafter as "MCT"), average cycle time (referred to alternately hereinafter as "ACT"), accuracy, escalation percentage, volume and client target date.

The invention may use any other suitable factors to compute and rank employee performance. Thus, factors relating to time elapsed during an employee's performance of assigned tasks, an accuracy level of an employee's performance of assigned tasks, the quality of an employee's performance of assigned tasks, the volume of an employee's task completion and/or any other suitable factors may also be used by the invention to compute and rank employee performance.

For example, in place of a median cycle time factor, the invention may instead include a factor relating to a percent cycle time and/or a benchmark cycle time. Additionally, in place of an escalation factor, the invention may instead use a factor relating to rework requests and/or audit requests. Thus, the factors used herein (MCT, accuracy, escalation percentage, volume and client target date) are exemplary and the invention includes the deletion of one or more of the aforementioned factors and/or the addition of one or more similar or distinct factors.

The MCT factor may relate to time elapsed during employee performance of each of a plurality of tasks during the predetermined time period. A raw score relating to the MCT factor may be calculated at least in part by (1) summing a number of times that, during the predetermined time period, the employee completed a task faster than an MCT associated with the completed task and (2) dividing the resultant sum by a total number of tasks that the employee completed during the predetermined time period. It should be noted that the total number of tasks may relate to the total number of tasks completed during the predetermined time period to which an MCT has been assigned.

It should be noted that the employee ranking application may calculate an MCT for each of a plurality of tasks completed during the predetermined time period. The employee ranking application may execute this calculation by accessing data stored in one or more databases relating to the plurality of tasks. The data may include a description of each of the plurality of completed tasks, a length of time associated with the completion of the task, the employee(s) who worked on the task, a Line of Business (referred to alternately hereinafter as "LOB") associated with the task and information identifying the task as being a new task or a maintenance task.

In some embodiments, the employee ranking application may calculate an MCT for each task description. In other embodiments, the employee ranking application may execute two or more MCT calculations for each task description. In these embodiments, the employee ranking application may group tasks associated with the same task description according to their associated LOB and new/maintenance status. The LOB associated with the tasks may be determined according to the external LOB designation of a client associated with the task or by an internal designation determined by managerial hierarchy. The employee ranking application may then execute an MCT calculation for each of the tasks with the same task description that are associated with the same LOB and the same new/maintenance status.

It should be noted that an MCT calculation for a plurality of tasks with the same task description may include identifying the periods of time associated with the completion of each of the plurality of tasks. The MCT calculation may further include identifying the median value included in the accessed data and identifying this value as the MCT value for the plurality of tasks.

In other embodiments, an ACT factor may be used in place of an MCT factor. In these embodiments, a raw score relating to the ACT factor may be calculated at least in part by (1) summing a number of times that, during the predetermined time period, the employee completed a task faster than an ACT associated with the completed task and (2) dividing the resultant sum by a total number of tasks that the employee completed during the predetermined time period.

It should be noted that an ACT calculation for a plurality of tasks with the same task description may include accessing the periods of time associated with the completion of each of the plurality of tasks. The ACT calculation may further include identifying the average value included in the accessed data and identifying this value as the ACT value for the plurality of tasks.

The accuracy factor may relate to whether or not an employee correctly performed assigned tasks during the predetermined time period. A raw score relating to the accuracy factor may be calculated by the equation: $[1-(sum(errors))/(sum(volume))]*100\%$. Sum(errors) may relate to a sum of a number of tasks, executed by the employee during the predetermined time period, that are associated with one or more errors. Sum(volume) may relate to a sum of a total number of tasks executed by the employee during the predetermined time period.

In some embodiments, data relating to the errors associated with the performed tasks may be transmitted to the employee ranking application in the form of a report such as, for example, a Product Error Analysis Report. In some embodiments, the employee ranking application may count a total of one error for each task associated with one or more errors. Thus, two errors that affected a single task may result in one error being added to the sum(errors). Additionally, a single error that affects two different tasks may result in two errors being added to the sum(errors).

Furthermore, the employee ranking application may filter the data included in the Product Error Analysis Report. For example, errors that were found and fixed by the employee executing the task may not be included in the sum(errors). Additionally, errors of 'client requested change,' no error to report' and any other errors that indicate no error by an employee may not be included in the sum(errors).

The escalation percentage factor may relate to whether a complaint was filed relating to a task performed by an employee during the predetermined time period. The raw score relating to the escalation percentage factor may be calculated by the equation: $[1-(sum(escalations))/(sum(volume))]*100\%$. Sum(escalations) may relate to the sum of a number of tasks that an employee worked on, during the predetermined time period, for which a complaint was filed. Sum(volume) may relate to the sum of a total number of tasks completed by the employee during the predetermined time period.

In some embodiments, escalation data may be provided to the employee ranking application by a report such as, for example, an Escalation Response Team Report. The invention may filter the provided data by removing status requests, data where no error occurred and any other data where the escalation cannot be attributed to an employee.

The volume factor may relate to a quantity of jobs that the employee performed during the predetermined time period. A raw score relating to the volume factor may be calculated by the equation: (employee volume score/average volume score) *100. Employee volume score may relate to a number of tasks completed by an employee during the predetermined time period. Average volume score may relate to the average number of tasks completed by the employees included in the employee's peer group during the predetermined time period.

In some embodiments, in the event that an employee completed different types of tasks such as new tasks and maintenance tasks during the predetermined time period, the raw score relating to the volume score may be calculated by the alternative equation: $([[employee\ new\ volume\ score/average\ new\ volume\ score]+[employee\ maintenance\ volume\ score/average\ maintenance\ volume\ score]]/2)*100\%$.

In these embodiments, employee new volume score may relate to a number of new tasks completed by an employee during the predetermined time period. Average new volume score may relate to the average number of new tasks completed by the employees included in the employee's peer group during the predetermined time period. Employee maintenance volume score may relate to a number of maintenance tasks completed by the employee during the predetermined time period. Average maintenance volume score may relate to the average number of maintenance tasks completed by the employees included in the employee's peer group during the predetermined time period.

The client target date (referred to alternately hereinafter as "CTD") factor may relate to how often an employee met the CTD assigned to each of his completed tasks during the predetermined time period. A raw score relating to the client target date factor may be calculated by the equation: [sum (tasks that beat the CTD)/sum(tasks with CTD provided)] *100%. Sum(tasks that beat the CTD) may relate to the sum of a number of tasks that the employee executed during the predetermined time period that were completed on a calendar data that preceded or met the CTDs assigned to the tasks. Sum(tasks with CTD provided) may relate to the sum of a total number of tasks completed by the employee during the predetermined time period to which a CTD has been assigned.

It should be noted that the aforementioned equations used by the employee ranking application to calculate raw scores for the MCT, ACT, accuracy, escalation percentage, volume and CTD factors are exemplary. The invention includes any modifications to the aforementioned equations and/or the substitution of the aforementioned equations by other suitable equations to calculate one or more of the raw scores.

It should additionally be noted that the employee ranking application may calculate raw data scores for a plurality of employees. The raw data scores calculated for the plurality of employees may be raw data scores relating to one or more of the MCT, accuracy, escalation percentage, volume and CTD factors.

In addition to the computation of raw scores for each of the plurality of employees, the employee ranking application may also divide the plurality of employees into a hierarchy that includes two or more peer groups.

For example, a corporation may desire to divide its employee body into multiple peer groups. The corporation may want each of the peer groups to relate to a LOB within the corporation. In these embodiments, the peer groups may include, for example, a Commercial group, a Large Corporate and Commercial Real Estate Banking group, an Implementation Product Coordinator group and/or a Middle Office Implementation Advisor group.

The corporation may alternatively decide to divide its employees into a plurality of peer groups, wherein two or more peer groups may be associated with a single LOB within the corporation. For example, a corporation with three LOBs may group their employees by their LOB and then further divide the employees within each LOB into two or more peer groups.

In an exemplary embodiment, peer groups associated with a single LOB may relate at least in part to a length of time that the employees have been working in the LOB. For example, employees may be divided into peer groups relating to employees who have been working for 0-3 months, 4-12 months and more than 12 months in the LOB. The peer groups may also include a peer group relating to employees who have been working for more than 12 months in a Regular Role and/or a peer group relating to employees who have been working for more than 12 months in a Complex Role. A Regular Role may relate to an employee's role whose assigned tasks include standard tasks. A Complex Role may relate to an employee's role whose assigned tasks include complex tasks that are generally more difficult than standard tasks.

Upon the division of the plurality of employees into two or more peer groups, the employee ranking application may rank each of the employee's raw scores to calculate employee ranked scores. The employee ranking application may calculate a ranked score for an employee by ranking an employee raw score associated with one of the factors against the raw scores calculated for the employees included in the employee's peer group that are associated with the same factor. The raw scores may be ranked using percentile rankings In some embodiments, the employee ranking application may rank all raw scores calculated for employees included in each of the peer groups. In other embodiments, employees in the 0-3 month peer group(s) may be provided raw scores but not ranked.

It should be noted that the employee ranking application may rank an employee's raw score x using the equation: $[(B+0.5E)/N]*100\%$, where B represents a number of raw scores less than raw score x, E represents a number of raw scores equal to raw score x and N represents a total number of raw scores. Alternatively, employee ranking application may rank an employee's raw score x using the equation: $[(\text{number of scores less than x})/N]*100\%$, where N represents a total number of raw scores.

The employee ranking application may compute a Weighted Score Average for each employee. The Weighted Score Average may be computed by weighing each of an employee's raw scores and summing the resultant weighted values. The weight assigned to each of the employee's raw scores may be predetermined and/or selectable.

The employee ranking application may also compute a Weighted Rank Average for each employee. The Weighted Rank Average may be calculated by multiplying each of an employee's ranked scores by a predetermined weight and summing the resultant weighted values.

The employee ranking application may further compute an Overall Percent Rank for each employee. The Overall Percent Rank may be computed by ranking each employee's Weighted Rank Average against the Weighted Rank Averages calculated for the employee's peers within his peer group. These rankings may be percentile rankings It should be noted that, in the event that one or more factors are added or deleted from the exemplary factors of MCT, accuracy, escalation percentage, volume and client target date, the employee ranking application may calculate raw scores for the new subset of factors. The employee ranking application may subsequently use the calculated raw scores to compute ranked scores, Weighted Score Averages, Weighted Rank Averages, and/or Overall Percent Ranks as described above.

The employee ranking application may display on a graphical user interface (referred to alternately hereinafter as "GUI") the raw scores, ranked scores, Weighted Score Averages, Weighted Rank Averages and/or Overall Percent Ranks computed for a plurality of employees ranked by the invention. In some embodiments, the GUI may color-code one or more of the raw scores, ranked scores, Weighted Score Average scores, Weighted Rank Average scores and/or Overall Percent Rank scores that fall within a predetermined subset of scores.

In exemplary embodiments, the employee ranking application may color-code, in one or more colors, all ranked scores, Weighted Rank Average scores and/or Overall Percent Rank scores that fall within a top percent, middle percent and/or bottom percent of the calculated ranked scores, Weighted Rank Average scores and/or Overall Percent Rank Scores, respectively. For example, the GUI may color-code in green all Weighted Score Average scores calculated for a subset of employees (e.g. all employees in a single peer group) that fall within the top seventy-five percent of the Weighted Score Averages calculated for the subset of employees. The GUI may also color-code in red all Weighted Score Average scores that fall within the bottom fifteen percent of scores calculated for the subset of employees.

In some embodiments, the employee ranking application may provide an option to compare the performance of employees included in two or more peer groups. The employee ranking application may execute this comparison by normalizing one or more of the employees' raw scores, ranked scores, Weighted Score Average scores, Weighted Rank Average scores and/or Overall Percent Rank scores. The employee ranking application may subsequently compare the normalized scores by sorting, percentile ranking, or any other suitable comparison method.

In additional embodiments, the employee ranking application may compute one or more of an employee raw score, ranked score, Weighted Score Average score, Weighted Rank Average score and/or Overall Percent Rank score for a group of employees that provide similar work associated with different tasks. To execute this computation, the employee ranking application may normalize at least some of the data used in computing the employee's raw scores.

For example, the application may normalize the accuracy and/or escalation percentage raw scores to take into account a difficulty level associated with each of the different tasks. Additionally, the application may normalize the volume factor raw scores to take into account the volume expected for the tasks assigned to each employee. Furthermore, the client target date raw score may be normalized to remove any bias towards employees assigned tasks that are either harder or easier to complete than the tasks assigned to the rest of the group of employees.

The employee ranking application may include one or more receivers. The one or more receivers may receive data from one or more databases. The data may be in the form of a report, an excel spreadsheet, or any other suitable electronic format. In some embodiments, a predetermined time period may be selected. In these embodiments, the data received may be data pertaining to events that occurred during the predetermined time period.

The received data may be revised automatically and/or manually. For example, a spreadsheet including employee names may be updated to change all employee names into a standard format. Additionally, employee names that match employees that have been removed from their position may be deleted.

The employee ranking application may upload the received data into one or more employee ranking application databases. The uploaded data may be processed by one or more processors. The processor(s) may process the imported data to calculate raw scores relating to each of the MCT, ACT, accuracy, escalation percentage, volume and CTD factors. The processor may subsequently calculate the employee ranked raw scores, Weighted Score Averages, Weighted Rank Averages, and Overall Percent Ranks for the employees associated with the received data.

It should be noted that in the event that the employee ranking application has divided into a hierarchy a plurality of employees into two or more peer groups, the one or more databases may store data relating to the hierarchical division of the employees. Alternatively, the received data may include data relating to a peer group associated with each employee.

The employee ranking application may further include a graphical user interface. The GUI may be configured to display computed values relating to employee performance. The GUI may also be configured to display additional received information. The additional information may relate to names of employees being ranked, company hierarchies and factor weights.

The GUI may display the data on an Excel spreadsheet or any other suitable report. In the embodiment wherein the employee ranking application divides company employees into two or more peer groups, the GUI may be configured to display a plurality of spreadsheets, each spreadsheet including data relating to employees associated with a single peer group.

The GUI may include a 'refresh all' icon. The icon, when selected, may initiate the transmission of data from one or more databases and the recalculation of the employee's raw scores, ranked scores, Weighted Score Averages, Weighted Rank Averages and Overall Percent Ranks The spreadsheet may be interactive. In some embodiments, the GUI may display the weights assigned to each of the raw scores and/or ranked scores that are used to calculate the Weighted Score Averages and/or the Weighted Rank Averages. The weights may be selectable. Selection of each of the weights may enable a user to input a new weight value. Upon input of a new weight value, the employee ranking application may recalculate the Weighted Score Averages, Weighted Rank Averages and Overall Percent Ranks displayed on the GUI using the newly input weight values.

In additional embodiments, user placement of a cursor over a cell included in the GUI may prompt the display of information relating to that cell. For example, user placement of a cursor over a cell that includes stock information such as employee name, manager name, etc., may prompt the GUI to display additional related data. In some embodiments, placement of a cursor over an employee name may prompt the display of the employee's contact information.

In exemplary embodiments of the invention, user placement of a cursor over a cell that includes a value calculated by the invention may prompt the display of data included in the calculation of the value, one or more links to one or more databases from which data included in the calculation was received and/or any other suitable information relating to the value.

For example, user placement of a cursor over a cell displaying an employee's accuracy score may prompt the display of information relating to tasks in which the employee made one or more mistakes and/or information detailing the employee mistakes. User placement of a cursor over a cell displaying an employee's volume score may prompt the display of information relating to the tasks that the employee completed during the predetermined time period. Additionally, user placement of a cursor over a cell displaying an employee's escalation percentage score may prompt the display of information relating to one or more complaints received relating to one or more tasks the employee completed during the predetermined time period. Furthermore, user placement of a cursor over a cell displaying an MCT score may display each of the tasks that the employee completed and/or failed to complete during the MCT. User placement of a cursor over a cell displaying client target date information may include information relating to each of the tasks that the employee failed to complete prior to the client target data.

It should be noted that each of the above examples of information displayed on the GUI upon user placement of a cursor on a cell is exemplary and the invention contemplates multiple variations of displayed information.

Illustrative embodiments of apparatus and methods in accordance with the principles of the invention will now be described with reference to the accompanying drawings, which form a part hereof. It is to be understood that other embodiments may be utilized and structural, functional and procedural modifications may be made without departing from the scope and spirit of the present invention.

As will be appreciated by one of skill in the art upon reading the following disclosure, various aspects described herein may be embodied as a method, a data processing system, or a computer program product. Accordingly, those aspects may take the form of an entirely hardware embodiment, an entirely software embodiment or an embodiment combining software and hardware aspects.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

FIG. 1 is a block diagram that illustrates a generic computing device 101 (alternatively referred to herein as a "server") that may be used according to an illustrative embodiment of the invention. The computer server 101 may have a processor 103 for controlling overall operation of the server and its associated components, including RAM 105, ROM 107, input/output module 109, and memory 115.

Input/output ("I/O") module 109 may include a microphone, keypad, touch screen, and/or stylus through which a user of device 101 may provide input, and may also include one or more of a speaker for providing audio output and a video display device for providing textual, audiovisual and/or graphical output. Software may be stored within memory 115 and/or storage to provide instructions to processor 103 for enabling server 101 to perform various functions. For example, memory 115 may store software used by server 101, such as an operating system 117, application programs 119, and an associated database 111. Alternatively, some or all of server 101 computer executable instructions may be embodied in hardware or firmware (not shown). As described in detail below, database 111 may provide storage for information used in computing the median cycle time factor, accuracy factor, escalation percentage factor, volume factor, client target date factor, employee information and/or any other suitable information.

Server 101 may operate in a networked environment supporting connections to one or more remote computers, such as terminals 141 and 151. Terminals 141 and 151 may be personal computers or servers that include many or all of the elements described above relative to server 101. The network connections depicted in FIG. 1 include a local area network (LAN) 125 and a wide area network (WAN) 129, but may also include other networks. When used in a LAN networking environment, computer 101 is connected to LAN 125 through a network interface or adapter 113. When used in a WAN networking environment, server 101 may include a modem 127 or other means for establishing communications over WAN 129, such as Internet 131. It will be appreciated that the network connections shown are illustrative and other means of establishing a communications link between the computers may be used. The existence of any of various well-known protocols such as TCP/IP, Ethernet, FTP, HTTP and the like is presumed, and the system can be operated in a client-server configuration to permit a user to retrieve web pages via the World Wide Web from a web-based server. Any of various conventional web browsers can be used to display and manipulate data on web pages.

Additionally, application program 119, which may be used by server 101, may include computer executable instructions for invoking user functionality related to communication, such as email, short message service (SMS), and voice input and speech recognition applications.

Computing device 101 and/or terminals 141 or 151 may also be mobile terminals including various other components, such as a battery, speaker, and antennas (not shown).

A terminal such as 141 or 151 may be used by an administrator to open, view and process employee data and to issue one or more instructions regarding the computation and ranking of employee data. Employee data may be stored in memory 115. The employee data may be processed by an application such as one of applications 119.

Figure 2:
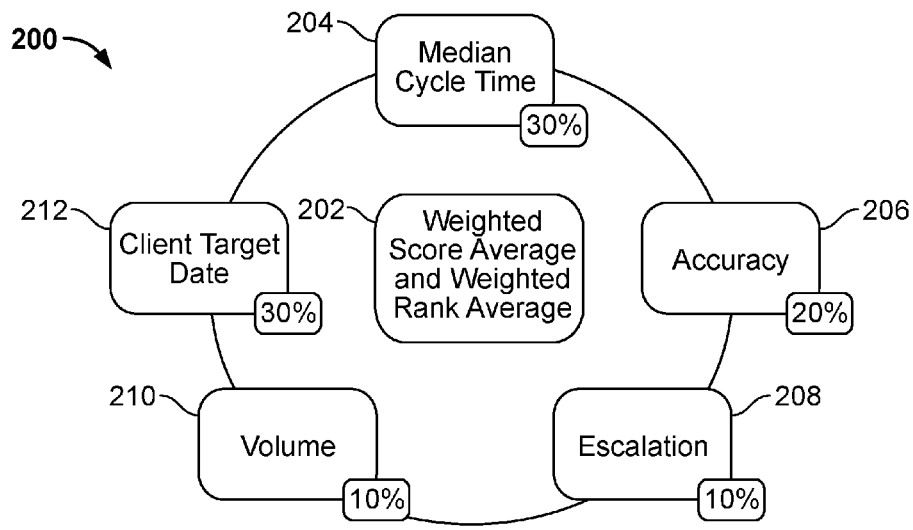
FIG. 2 shows an exemplary method that may be used in accordance with the systems and methods of the invention.

FIG. 2 shows exemplary method 200 that may be used in accordance with the systems and methods of the invention. In some embodiments, exemplary method 200 may be used by the employee ranking application to calculate Weighted Score Average and Weighted Rank Average 202.

Exemplary method 200 may be used by the employee ranking application to calculate Weighted Score Average and Weighted Rank Average 202 by assigning weights to Median Cycle Time 204, Accuracy 206, Escalation Percentage 208, Volume 210 and Client Target Date 212. Median Cycle Time 204 may be assigned a weight of 30%, Accuracy 206 may be assigned a weight of 20%, Escalation Percentage 208 may be assigned a weight of 10%, Volume 210 may be assigned a weight of 10% and Client Target Date 212 may be assigned a weight of 30%.

It should be noted that the calculation of the Weighted Score Average may be calculated by assigning the aforementioned weights to the employee raw scores and subsequently summing the weighted values. It should additionally be noted that the calculation of the Weighted Rank Average may be calculated by assigning the aforementioned weights to employee ranked scores and subsequently summing the weighted values.

Figure 3:
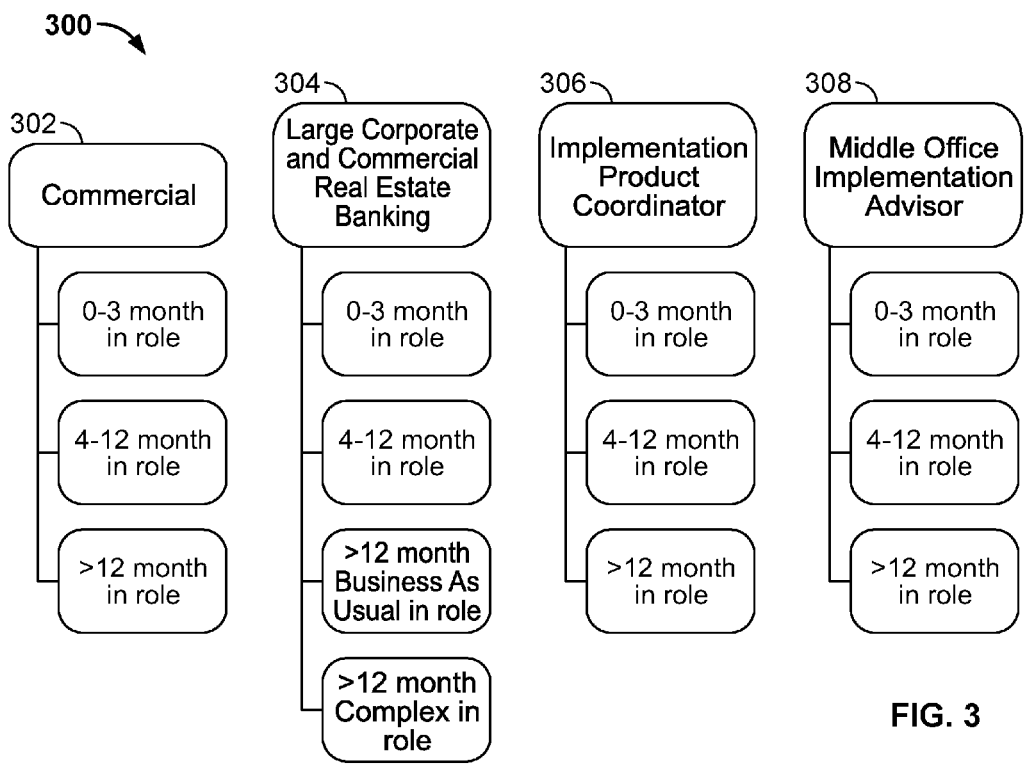
FIG. 3 shows another exemplary method that may be used in accordance with the systems and methods of the invention.

FIG. 3 shows exemplary method 300 that may be used in accordance with the systems and methods of the invention. Exemplary method 300 may be used to implement the hierarchical division of a plurality of employees into two or more peer groups. It should be noted that the plurality of employees may be employed at one or more corporations, businesses, or any other suitable entities.

Exemplary method 300 may include dividing a group of employees into thirteen peer groups. Commercial 302 may represent three hierarchical peer groups for employees employed in the commercial LOB. The three peer groups may include a peer group for commercial employees employed for 0-3 months, commercial employees employed for 4-12 months and commercial employees employed for more than 12 months.

Large Corporate and Commercial Real Estate Banking (referred to alternately hereinafter as "CREB") 304 may represent four hierarchical peer groups for employees employed in the Large Corporate and CREB LOB. The four peer groups may include a peer group for Large Corporate and CREB employees employed for 0-3 months, Large Corporate and CREB employees employed for 4-12 months, Large Corporate and CREB employees employed for more than 12 months in Business as Usual role and Large Corporate and CREB employees employed for more than 12 months in Complex role.

Implementation Product Coordinator (referred to alternately hereinafter as "IPC") 306 may represent three hierarchical peer groups for employees employed in the IPC LOB. The three peer groups may include a peer group for IPC employees employed for 0-3 months, IPC employees employed for 4-12 months and IPC employees employed for more than 12 months.

Middle Office Implementation Advisor (referred to alternately hereinafter as "MOIA") 308 may represent three hierarchical peer groups for employees employed in the MOIA LOB. The three peer groups may include a peer group for MOIA employees employed for 0-3 months, MOIA employees employed for 4-12 months and MOIA employees employed for more than 12 months.

It should be noted that the aforementioned examples of employee hierarchical division are exemplary and nonrestrictive. The systems and methods of the invention include any suitable hierarchical division of employees.

FIG. 4 illustrates electronic display 400 in accordance with the systems and methods of the invention. It should be noted that for the purposes of this application, an 'electronic display' may be understood to be a graphical user interface.

Electronic display 400 may include LOB for Stack Ranking 402. LOB for Stack Ranking 402 may display an employee's LOB. Electronic display 400 may also include Tenure 404. Tenure 404 may display the number of months that an employee has been employed in an LOB. High Complexity may 406 display whether or not an employee's LOB is categorized as high complexity. Electronic display 400 may further include Raw Scores 401, Weighted Score Average 403, Ranked Scores 405, Weighted Rank Average 407 and Overall Percent Rank 409.

Raw Scores 401 may display the raw scores of employees that relate to multiple factors. In electronic display 400, Raw Scores 401 displays the raw scores of two employees that relate to factors median cycle time 408, accuracy 410, escalation percentage 412, volume 414 and client target date 416.

Weighted Score Average 403 may display the sum of the weighted values of Raw Scores 401.

Ranked Scores 405 may display the rank of each of Raw Scores 401. Ranked Scores 405 may be computed by ranking each employee's raw score associated with one of factors 408-416 against all other employee raw scores in the same peer grouping associated with the same factor. Specifically, Ranked Scores 405 may display a median cycle time rank 418, accuracy rank 420, escalation rank 422, volume rank 424 and client target date rank 426.

Weighted Rank Average 407 may display the sum of the weighted values of Ranked Scores 405. Overall Percent Rank 409 may display the ranking of an employee's Weighted Rank Average 407 score against the Weighted Rank Average 407 scores calculated for the other employee's in his or her hierarchy.

FIG. 5 illustrates electronic display 500 in accordance with the systems and methods of the invention. Electronic display 500 may include one or more of elements 404, 407-410, 412, 414, 416, 418, 420, 422, 424 and 426. Electronic display may also include Date Range 502. Date Range 502 may display a predetermined time period. It should be noted that data used by the invention to compute raw scores 408, 410, 412, 414 and 416 may relate to data generated during the predetermined time period.

Electronic display 500 may also include columns relating to IA Name 504, Site Manager 506 and Rank LOB 508. Electronic display 500 may further include $75^{th}$ Percentile Score 510. $75^{th}$ Percentile Score 510 may display a raw score for each of the five factors that is greater than 75% of the raw scores of the employees included in electronic display 500. Electronic display may additionally include Weightings 512. Weightings 512 may display the weighted values used to calculate Weighted Rank Average 407. Electronic display may also include Commercial >12 Month 514. Commercial >12 Month 514 may display the title of the peer group assigned to each of the employees identified in column IA Name 504. Thus, in this display, each of the employees identified in column IA Name 504 are employed in the Commercial LOB and have been employed for more than twelve months.

In some embodiments, electronic display 500 may also display information relating to Product Count, Shared Count and Package Workplan ID count (not shown).

Thus, methods and apparatus for ranking employee performance data in accordance with the systems and methods of the invention have been provided. Persons skilled in the art will appreciate that the present invention can be practiced in embodiments other than the described embodiments, which are presented for purposes of illustration rather than of limitation, and that the present invention is limited only by the claims that follow.

What is claimed is:

1. Apparatus for ranking employees, the apparatus comprising:
 a receiver configured to receive information relating to performance, by an employee, of a plurality of tasks, wherein each of the plurality of tasks was completed during a predetermined time period;
 a processor configured to:
  compute, based at least in part on the received information:
   a median cycle time score, said median cycle time score comprising a number of times that the employee met a media cycle time assigned to one or more of the plurality of tasks, wherein the processor is configured to calculate the median cycle time score by (1) summing a number of times that, during the predetermined time period, the employee completed a task included in the plurality of tasks faster than a median cycle time associated with the completed task and (2) dividing the resultant sum by a sum of the plurality of tasks;
   an accuracy score, said accuracy score comprising a number of times than an employee error was recorded for one or more of the plurality of tasks, wherein the processor is configured to calculate the accuracy score using the equation:

$$[1-(sum(errors))/(sum(volume))]*100\%,$$

wherein
  sum(errors) comprises a sum of a subset of tasks included in the plurality of tasks that are associated with one or more errors; and
  sum(volume) comprises the sum of the plurality of tasks;
   an escalation percentage score, said escalation percentage score comprising a number of times that a complaint was recorded for one or more of the plurality of tasks, wherein the processor is configured to calculate the escalation percentage score using the equation:

$$[1-(sum(escalations))/(sum(volume))]*100\%;$$

wherein:
  sum(escalations) comprises a sum of a subset of tasks included in the plurality of tasks for which a complaint was filed; and
  sum(volume) comprises the sum of the plurality of tasks;
   a volume score, wherein the processor is configured to calculate the volume score using the equation:

$$(employee\ volume\ score/average\ volume\ score)*100,$$

wherein:
  employee volume score comprises the sum of the plurality of tasks; and
  average volume score comprises an average number of tasks completed by the employees included in the group of employees; and
   a client target date score, said client target date score comprising a number of tasks included in the plurality of tasks that met a client target date assigned to each of the number of tasks, wherein the processor is configured to calculate the client target date score using the equation;

$$[sum(tasks\ that\ beat\ the\ client\ target\ date)/sum(tasks\ with\ client\ target\ date\ provided)]*100\%,$$

wherein:
  sum(tasks that beat the client target date) comprises a sum of a subset of tasks included in the plurality of tasks that met the client target date associated with the task; and sum(tasks with client target date provided) comprises a sum of a number of tasks included in the plurality of tasks to which a client target date has been assigned;

wherein each of the median cycle time score, accuracy score, escalation percentage score, volume score and client target date score is normalized to reduce bias attributable to a difficulty level assigned by the processor for one or more of the plurality of tasks, wherein the difficulty level for a task is determined in relation to one or more different tasks; and rank, separately, using percentile ranking:

the median cycle time score against a plurality of median cycle time scores that were computed for a group of employees using data generated during the predetermined time period;

the accuracy score against a plurality of accuracy scores that were computed for a group of employees using data generated during the predetermined time period;

the escalation percentage score against a plurality of escalation percentage scores that were computed for a group of employees using data generated during the predetermined time period;

the volume score against a plurality of volume scores that were computed for a group of employees using data generated during the predetermined time period; and the client target date score against a plurality of client target date scores that were computed for a group of employees using data generated during the predetermined time period, wherein the processor is further configured to:

group the employee and each of the employees included in the group of employees according to line of business, wherein the employee and each of the employees included in the group are employed in the same line of business; and group the employee and each of the employees included in the group of employees based on the date that the employee and each of the employees included in the group began employment, wherein the employee and each of the employees included in the group began employment within a predetermined time span.

2. The apparatus of claim 1 wherein the predetermined time span is 0-3 months.

3. The apparatus of claim 1 wherein the predetermined time span is 4-12 months.

4. The apparatus of claim 1 wherein the predetermined time span is more than 12 months.

5. A method for ranking performance data of a plurality of employees, the method comprising:

receiving by a receiver, information relating to performance, by each of the employees, of a plurality of tasks, wherein each of the plurality of tasks were completed during a predetermined time period;

computing by a processor, for each of the plurality of employees, based at least in part on the received information;

a median cycle time score, said median cycle time score comprising a number of times that an employee met a median cycle time assigned to one or more of the plurality of tasks;

an accuracy score, said accuracy score comprising a number of times that an employee error was recorded for one or more of the plurality of tasks;

an escalation percentage score, said escalation percentage score comprising a number of times that a complaint regarding an employee was recorded for one or more of the plurality of tasks;

a volume score, said volume score based at least in part on a sum of the plurality of tasks and based at least in part on an average number of tasks completed by the employees; and a client target date score, said client target date score comprising a number of tasks included in the plurality of tasks that met a client target date assigned to each of the number of tasks;

wherein each of the median cycle time score, accuracy score, escalation percentage score, volume score and client target date score is normalized by the processor to reduce bias attributable to a difficulty level assigned by the processor for one or more of the plurality of tasks, wherein the difficulty level for a task is determined in relation to one or more different tasks; and ranking by the processor, using percentile ranking (1) median cycle time scores, (2) accuracy scores, (3) escalation percentage scores, (4) volume scores and (5) client target date scores, wherein the median cycle time scores, the accuracy scores, the escalation percentage scores, the volume scores and the client target date scores are each ranked separately against a plurality of scores that were computed for a group of employees;

calculating by the processor a weighted rank average score for each of the plurality of employees based at least in part on (1) weighing the median cycle time score, accuracy score, escalation percentage score, volume score and client target date score associated with the employee, and (2) summing the weighted median cycle time score, accuracy score, escalation percentage score, volume score and client target date score; and calculating by the processor an overall percent rank for each of the plurality of employees, the overall percent rank being calculated at least in part by ranking, using percentile ranking, the weighted rank average scores calculated for each of the plurality of employees.

6. The method of claim 5, wherein each of the plurality of employees are employed in the same line of business.

7. The method of claim 6, wherein each of the plurality of employees began employment in the line of business within a predetermined time span.

8. The method of claim 5, wherein the median cycle time score comprises a number of times that an employee included in the plurality of employees met a median cycle time assigned to one or more of the plurality of tasks.

9. The method of claim 5, wherein the accuracy score comprises a number of times that an employee included in the plurality of employees executed a task to which an error was recorded.

10. The method of claim 5, wherein the escalation percentage score comprises a number of times that a complaint was recorded for one or more tasks assigned to an employee included, in the plurality of employees.

11. The method of claim 5, wherein the volume score comprises a numerical value associated with a plurality of tasks completed by an employee included in the plurality of employees during the predetermined time period.

12. The method of claim 5, wherein the client target date score comprises a number of tasks completed during the predetermined time period by one of the employees included in the plurality of employees that met a client target date.

13. The apparatus of claim 1, wherein the predetermined time span is an integer number of months.

14. The apparatus of claim 1, wherein the predetermined time span is an integer number of days.

* * * * *